(12) United States Patent
Tran et al.

(10) Patent No.: US 6,761,809 B2
(45) Date of Patent: Jul. 13, 2004

(54) ALTERNATING-POLARITY OPERATION FOR COMPLETE REGENERATION OF ELECTROCHEMICAL DEIONIZATION SYSTEM

(75) Inventors: Tri D. Tran, Livermore, CA (US); David J. Lenz, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 32 days.

(21) Appl. No.: 10/037,288

(22) Filed: Jan. 3, 2002

(65) Prior Publication Data

US 2002/0084188 A1 Jul. 4, 2002

Related U.S. Application Data

(62) Division of application No. 09/234,586, filed on Jan. 21, 1999, now Pat. No. 6,346,187.

(51) Int. Cl.[7] .............................................. B23H 3/04
(52) U.S. Cl. ................... 204/286.1; 204/284; 204/280; 204/290.1
(58) Field of Search ................................. 204/280, 284, 204/286.1, 290.1, 290.13, 290.3

(56) References Cited

U.S. PATENT DOCUMENTS 5,425,858 A * 6/1995 Farmer ....................... 204/450
5,547,581 A * 8/1996 Andelman .................. 210/656

* cited by examiner

Primary Examiner—Wesley A. Nicolas
(74) Attorney, Agent, or Firm—Alan H. Thompson

(57) ABSTRACT

An electrically regeneratable battery of electrochemical cells for capacitive deionization (including electrochemical purification) and regeneration of electrodes is operated at alternate polarities during consecutive cycles. In other words, after each regeneration step operated at a given polarity in a deionization-regeneration cycle, the polarity of the deionization step in the next cycle is maintained. In one embodiment, two end electrodes are arranged one at each end of the battery, adjacent to end plates. An insulator layer is interposed between each end plate and the adjacent end electrode. Each end electrode includes a single sheet of conductive material having a high specific surface area and sorption capacity, preferably a sheet formed of carbon aerogel composite. The battery further includes a plurality of generally identical double-sided intermediate electrodes that are equidistally separated from each other, between the two end electrodes. As the electrolyte enters the battery of cells, it flows through a continuous open serpentine channel defined by the electrodes, substantially parallel to the surfaces of the electrodes. By polarizing the cells, ions are removed from the electrolyte and are held in the electric double layers formed at the carbon aerogel surfaces of the electrodes. As the electrodes of each cell of the battery are saturated with the removed ions, the battery is regenerated electrically at a reversed polarity from that during the deionization step of the cycle, thus significantly minimizing secondary wastes.

7 Claims, 7 Drawing Sheets

ALTERNATING-POLARITY OPERATION FOR COMPLETE REGENERATION OF ELECTROCHEMICAL DEIONIZATION SYSTEM

This application is a division of Ser. No. 09/234,586 filed on Jan. 21, 1999 now U.S. Pat. No. 6,346,187.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention is generally directed to the field of electrochemistry, and it relates to a new separation method and apparatus for removing ions, contaminants and impurities from water and other aqueous process streams. More specifically the invention relates to a new regeneration method for placing the removed ions back into solution.

2. Background Art

The separation of ions and impurities from electrolytes has heretofore been generally achieved using a variety of conventional processes including: ion exchange, reverse osmosis, electrodialysis, electrodeposition, or filtering. Several alternatives have been proposed that address the problems associated with the conventional separation processes. However, such alternatives have not been completely satisfactory for specific applications nor useful for all applications, and have not met with universal commercial success or complete acceptance.

The conventional ion exchange process has been used as a means for removing anions and cations, including heavy metals and radioisotopes, from process and waste water in various industries. This process generates large volumes of corrosive secondary wastes that must be treated for disposal through regeneration processes. Existing regeneration processes are typically carried out following the saturation of the columns by ions, by pumping regeneration solutions, such as concentrated acids, bases, or salt solutions through the columns. These routine maintenance measures produce significant secondary wastes, as well as periodic interruptions of the deionization process.

Secondary wastes resulting from the regeneration of the ion exchangers typically include used anion and cation exchange resins, as well as contaminated acids, bases and/or salt solutions. For example, $H_2SO_4$ solutions have been used for the regeneration of cation columns in metal finishing and power industries; $HNO_3$ solutions have been used for the regeneration of cation columns used in processing nuclear materials; and NaCl solutions have been used in residential water softening processes.

Under an applied electrical field, ionic species in solution can be separated from the aqueous solution by a variety of means. The use of flow-through or flow-by electrochemical cells containing porous, high-surface-area, electrically conductive carbonaceous electrodes have been employed for separation of ionic species in solution. The electrodeposition of metals from aqueous solutions where electron transfer takes place between the carbon electrode and the ions in solution has been employed. Without apparent electron-transfer steps at potentials less than the reduction potentials of the soluble species, ionic species are thought to be separated from the solution by a simple electrostatic separation where they are held within the electrical double-layer formed at the solution-electrode interface, i.e., capacitive deionization. Such deionization of the solution by a capacitive process has been proposed in the early 1960's by Arnold and his colleagues [B. B. Arnold, G. W. Murphy, J. Phys. Chem. 65 1 (1961) 135–138.]. Their capacitive deionization (CDI) process was suggested for desalination of brackish water.

In one capacitive deionization method described in U.S. Pat. No. 5,425,858 issued to Farmer (herein referred as "Farmer"), a stream of electrolyte to be processed, which contains various anions and cations, electric dipoles, and/or suspended particles, is passed through a stack of electrochemical capacitive deionization cells, i.e., a capacitor. Each of these cells of the capacitor includes numerous electrodes having exceptionally high specific surface areas (for example, carbon aerogel having a surface area of 400–1000 m2/gm). By polarizing the cell, non-reductible and non-oxidizable ions are removed by electrodeposition. Electric dipoles also migrate to and are trapped at the electrodes. Small suspended particles are removed by electrophoresis. Therefore, the fluid stream leaving the cell is purified.

The Farmer method is an efficient deionization process since the pressure drop in the capacitive deionization cell is dictated by channel flow between parallel surfaces of monolithic, microporous solids (i.e., the electrodes) and across (rather than through) such surfaces. Hence, it is insignificant compared to that needed to force water through the permeable membrane required by the reverse osmosis process as well as capacitive deionization processes described by Andelman in, for example, U.S. Pat. Nos. 5,547,581, 5,415,768, 5,360,540, 5,200,068, and 5,192,432.

A feature of the Farmer separation system is that no expensive ion exchange membranes are required for the separation of the electrodes. All the anodes and cathodes of the electrode pairs define individual cells that are connected in series, each pair defining an open, unobstructed channel for fluid flow between the electrode pair. The system is modular and can be readily expanded to include several electrode pairs (i.e. cells or modules) thus forming a capacitor with a relatively large anode or cathode total surface area. Typically, the electrode pair modules are arranged so that fluid flow through the capacitor is in a serpentine pattern across, rather than through, a relatively large number of intermediate electrode pairs having no dimension open to the exterior of the cell(s) or capacitor (other than those electrode pairs at a single fluid input and single fluid output location). Ultimately, the Farmer system capacity can be increased to any desired level by expanding the capacitor to include a substantial number of electrode pairs. Although each electrode pair can define a single cell, in the Farmer system all of the closed series of cells formed by the intermediate electrode pairs act as a single cell or capacitor.

The Farmer system is not without its problems; underpotential deposition, electrodeposition, chemisorption, electrophoresis and other separation phenomena involving a charge transfer across the carbon surface and the liquid electrolyte can also occur. These types of processes affect the reversibility and robustness of the deionization-regeneration cycle (process). Under such conditions, the regeneration and/or rejuvenation of the saturated electrode and cell system would dictate the performance and overall effectiveness of the deionization process. Recent efforts have focused on the efficiency and effectiveness of the regeneration of multiple-cell stacks containing the above-described carbon aerogel compounds.

The electrosorption of simple ionic compounds such as NaCl, $NH_4Cl$ and $NaNO_3$ may be accomplished reversibly if cells can be regenerated or rejuvenated with deionized water over a long period of time and with voltage reversal as appropriate. However, several techniques for effective and optimal regeneration methods have been suggested. Even under a low or mild applied potential (i.e., <1.2V in water-based streams) for removal of ions, certain charge transfer processes have been shown to occur which have given rise to deposited or strongly bound species. During regeneration, even with a reversed polarity, the applied voltage to capacitive systems may not be sufficient to conteract fractions of the ions that remain attracted strongly by other means such as undepotential deposition or chemisorption. Accordingly, a cycle efficiency (i.e., the ratio of the amount of salt recovered during regeneration over that determined during deionization expressed in terms of percentage) never reaches 100%, particularly over many successive cycles and especially when the total regeneration time and the total deionization time is the same. Certain features of such inherent inefficiency have been observed in results presented in previous investigations. Under special treatments, aged electrodes can, however, be rejuvenated to regain degraded capacity. Farmer et al. in the Journal of the Electrochemical Society, 143, pp. 159–169, 1996) has reported that electrodes that have been aged naturally for many experiments over several months have been rejuvenated to close to the original capacity by reversing the polarity for a short period of time. U.S. Pat. No. 5,620,597, issued to Andelman, has suggested that electrodes of carbon fibers and activated carbon powders (arranged to form short fluid pathways, each open in at least one dimension to the exterior of the capacitor) can be maintained by alternating the polarity in successive cycles. However, limited data have been collected on the regeneration of such saturated electrodes on an electrochemical cell basis. Presently, no process has effectively shown the efficacy and efficiency of continuously processed deionization-regeneration cycles.

Regeneration of the Farmer system at the same or lesser time than the actual deionization step in a given cycle has not been shown. Furthermore, contaminated water usually contains a variety of ions and species with different properties. Use of chemical regenerants, deionized water, long regenerating time and voltage reversal is needed to completely rejuvenate the system if such a system is not regenerated immediately and allowed to age under such extreme conditions.

Timely regeneration and activation of electrodes can allow brief extension of the operating voltage window to thus expand the capacity of the electrodes without irreversibly damaging the electrodes. Accordingly, deionization (e.g., desalination) can be accomplished at potentials above that of water electrolysis which is 1.2V. A short voltage pulse above 1.2 V can allow more efficient enhancement of the capacity without generating significant gas amounts by electrolysis. Subsequent operation at a reversed voltage will rereact this small amount of gases and reversibly restore the electrode capacity.

Thus, a need exists for a new method/technique for a complete deionization-regeneration cycle which continuously maintains the efficacy and efficiency of the deionization system. Such a process can significantly reduce, if not entirely eliminate, secondary wastes in certain applications, and does not cause a considerable pressure drop in the flowing process stream or require significant energy expenditure. Deionization methods should not require a short fluid pathway in electrosorption systems, should not require salt additions for ion regeneration in a water softening system, and further should not require additional desalination devices, such as reverse osmosis filters, to remove the excess sodium chloride introduced during regeneration.

Additionally, the new method should enable the separation of any inorganic or organic ion or dipole from any ionically conducting solvent, which could be water, an organic solvent, or an inorganic solvent. For example, it should be possible to use such a process to purify organic solvents, such as propylene carbonate, for use in lithium batteries and other energy storage devices. Furthermore, it should be possible to use such a process to remove organic ions, such as formate or acetate from aqueous streams.

The new method should further be adaptable for use in various applications, including without limitation, treatment of boiler water in nuclear and fossil power plants, production of high-purity water for semiconductor processing, removal of toxic and hazardous ions from water for agricultural irrigation, and desalination of sea water.

Therefore, there is still a significant unfulfilled need for a new method and apparatus for deionization and regeneration which, in addition to the ability to significantly reduce if not to completely eliminate secondary wastes associated with the regeneration of ion exchange columns, do not result in a considerable pressure drop of the flowing process stream, and do not require significant energy expenditure. Furthermore, each electrode used in an apparatus employed for deionization and regeneration should be made of a structurally stable, porous, monolithic solid. Such monolithic electrodes should not become readily entrained in, or depleted by the stream of fluid to be processed, and should not degrade rapidly with cycling. These electrodes should have a very high specific surface area; they should be relatively thin, require minimal operation energy, and have a high removal efficiency. The new method should be highly efficient and should be adaptable for use in a variety of applications including, but not limited to, sea water desalination.

SUMMARY OF THE INVENTION

A separation method or system, referred to as capacitive deionization (CDI), is employed for the deionization of water containing electrolytes and the treatment of aqueous wastes. Such a system is designed so that the deionization can be accomplished by an applied electrical potential, preferably reversibly—even where the applied voltage exceeds about 1.2 V up to about 1.7 V. The inventive process involves a combination of deionization and regeneration steps in each cycle under conditions whereby the capacity to remove charged contaminant particles is greatly enhanced and the system can be reversibly regenerated over the course of several cycles, preferably during alternating cycles. Unlike conventional ion exchange processes, no chemicals, whether acids, bases, or salt solutions, are required for the regeneration of the system; instead, electricity is used.

A fluid stream of electrolyte to be treated, which contains various anions and cations, electric dipoles, and/or suspended particles, is passed in a serpentine path through a stack of electrochemical capacitive deionization cells (i.e., a battery of connected, spaced apart, anode/cathode pairs, each pair operable as an electrochemical cell). Each of these cells contains high surface area, low resistive (e.g., less than electrodes, preferably including carbon aerogel electrodes having exceptionally high specific surface areas (for example, 400–1000 m2/gm). By polarizing the cell, non-reducible and non-oxidizable ions are removed from the fluid stream electrostatically and held in the electric double layers formed at the surfaces of the electrodes and the fluid stream leaving the cell is purified. Some metal cations are removed by electrodeposition. Electric dipoles also migrate to and are trapped at the electrodes. Small suspended particles are removed by electrophoresis.

In a preferred embodiment, the contaminated fluid is passed through an open channel defined between at least two pairs of intermediate electrodes of the battery of electrochemical cells operating at a positive polarity so as to deionize the fluid. The open channel between the intermediated electrodes has no dimension open to the exterior of the battery. The deionization step is interrupted to electrostatically regenerate the battery, and an additional portion of the contaminated fluid is then passed through the battery operating at a negative polarity to deionize an additional portion of the fluid.

In the present CDI process, energy is expended using electrostatics to remove salt and other impurities from the fluid, and, as a result, is more energy efficient than previous processes. Furthermore, the pressure drop in the capacitive deionization cells is dictated by open channel flow between generally parallel surfaces of monolithic, microporous solids (i.e., the electrodes); hence, such pressure drop is insignificant (i.e., less than about 5 psig) compared to that needed to force water through the permeable membrane required by the reverse osmosis process.

More particularly, the invention relates to the regeneration of the saturated or nearly saturated cells that significantly affect the overall purification/regeneration cycle and its efficiency in continuous operation. The most effective means for achieving and maintaining high capacity and regeneration efficiency involves systematically alternating the polarity of the stack in successive deionization (i.e., purification) steps. The multiple-cell stack (i.e., battery) operating under this condition and with a serpentine fluid (and electrolyte) flow path, retains more than 95%, and in some cases, close to 100% of its capacity after many cycles. A series of experiments employing the multi-cell serpentine flow stacks of the invention has exhibited a product recovery ratio exceeding that for a comparable multi-cell stack having parallel open channel anode/cathode pair cells with at least one dimension open to the exterior.

The CDI separation system has no expensive ion exchange membranes required for the separation of the electrodes. All the anodes and cathodes of the electrode pairs are electrically connected in parallel and the stacked multi-cell capacitor is arranged so the unobstructed, open channel defined by the anode and cathode pairs allows the serpentine path for the fluid stream. The capacity of the modular inventive system can be increased to any desired level by expanding the cell(s) to include at least three, at least four, and preferably several electrode pairs in the battery. Although at least one pair of anode/cathode electrodes at fluid input and output from the battery has a dimension open to the exterior of the capacitor, the majority, and normally greater than 90%, of the intermediate electrode pairs arranged in the interior of the stack have no dimension open to the exterior.

Advantages of the present invention include, but are not limited to, the following:

In the present system, electrolyte flows in open channels formed between two adjacent, planar electrodes, which are usually geometrically parallel, although nonparallel configurations apparent to those of ordinary skill in the art may also be employed. Consequently, the pressure drop is much lower than conventional processes. The fluid flow can be gravity fed through these open channels, or a pump can be used.

The CDI system does not require membranes, which are both troublesome and expensive, which rupture if overpressured, which add to the internal resistance of the overall capacitive cell (capacitor), and which further reduce the system energy efficiency.

The electrodes in the CDI system encompass immobilized sorption media, such as monolithic carbon aerogel, which is not subject to entrainment in the flowing fluid stream. Thus, material degradation due to entrainment and erosion is considerably less than in conventional packed carbon columns.

The present systems and methods are inherently and greatly energy efficient. For instance, in both evaporation and reverse osmosis processes, water is removed from salt, while in the present systems, salt is removed from water, thus expending less energy.

The present systems and methods present superior potential distribution in the thin sheets of carbon aerogel; most of the carbon aerogel is maintained at a potential where electrosorption is very efficient, such as around about 1.2 v.

The above advantages of the present invention are realized by new electrically regeneratable electrochemical cells (battery) for capacitive deionization and electrochemical purification and regeneration of electrodes. The cell includes two end plates, one at each end of the cell, as well as two end electrodes that are arranged one at each end of the cell, adjacent to the end plates. An insulator layer is interposed between each end plate and the adjacent end electrode.

Each end electrode includes an electrosorption medium having a high specific surface area and sorption capacity. In the preferred embodiment, the electrosorption medium is formed of carbon aerogel composite. The battery further includes one or more intermediate electrodes that are disposed between the two end electrodes. As the electrolyte enters each cell, it flows through a continuous open serpentine channel defined by the electrodes, substantially parallel to the surfaces of the electrodes. By polarizing each cell, ions are removed from the electrolyte and are held in the electric double layers formed at the carbon aerogel surfaces of the electrodes. As each cell is saturated with the removed ions, each cell is regenerated electrically, thus significantly minimizing secondary wastes.

DETAILED DESCRIPTION OF THE PREFERRED EMBODIMENTS

Figure 1:
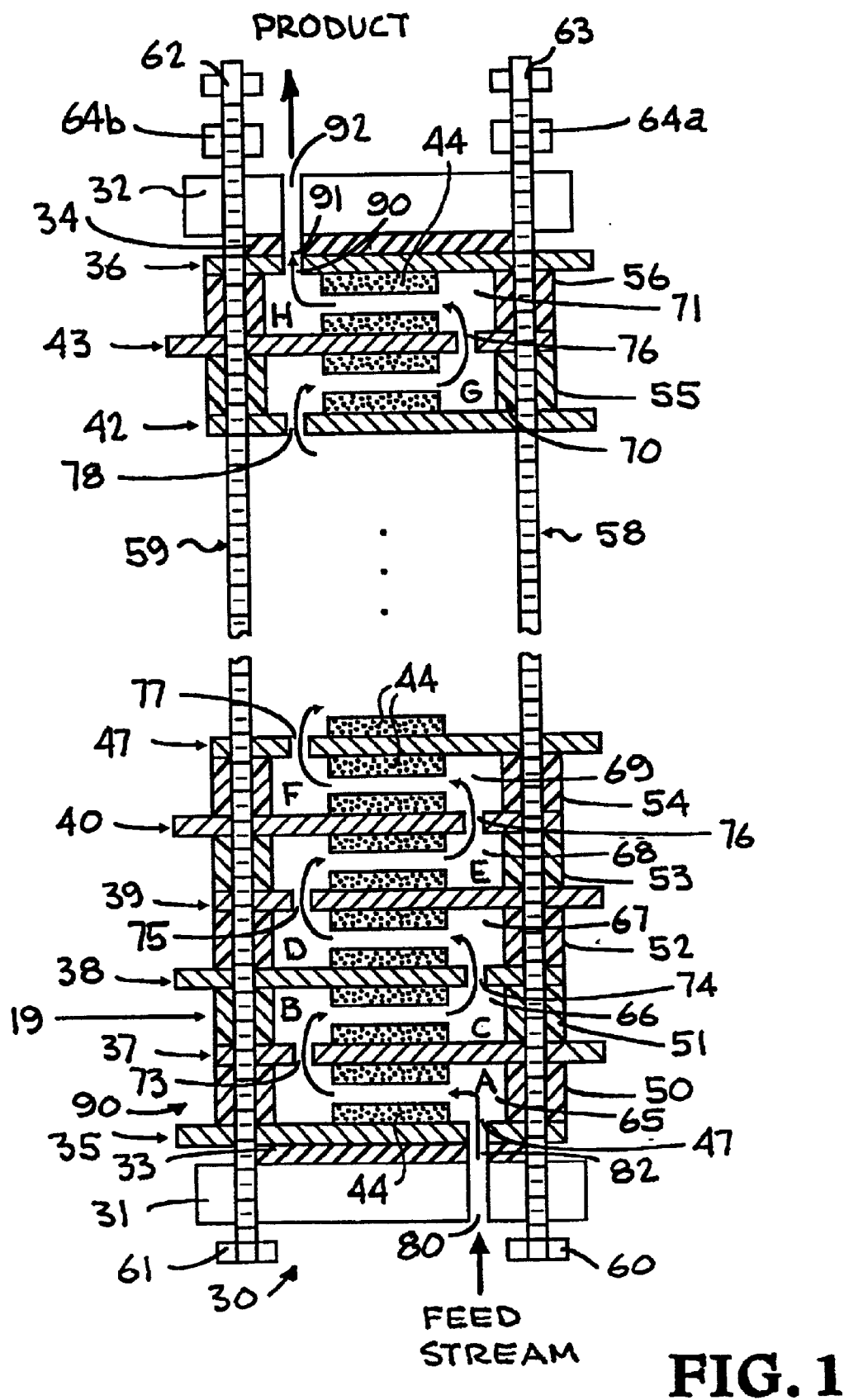
FIG. 1 is a schematic, sectional, elevational view of a battery of electrochemical cells.

FIG. 1 illustrates an electrochemical battery 30 which generally includes two oppositely disposed, spaced-apart end plates 31 and 32, one at each end of the battery 30, two generally identical single-sided end electrodes 35, 36, one at each end of the battery 30, adjacent to the end plates 31 and 32, respectively. An insulator layer 33 is interposed between the end plate 31 and the end electrode 35. Similarly, an insulator layer 34 is interposed between the end plate 32 and the end electrode 36. Each single-sided electrode 35, 36 includes a single sheet of high surface electrosorption medium 44, e.g., carbon aerogel composite bonded to one side of a titanium (or other functionally equivalent) sheet with a conductive epoxy or other appropriate bonding material.

A plurality of generally identical double-sided intermediate electrodes 37–43 are spaced-apart and equidistally separated from each other, between the two end electrodes 35, 36. Each double-sided electrode, i.e., 37–43, includes two sheets of carbon aerogel composite 44 bonded to both sides of a titanium sheet (e.g., electrode 40) with conductive epoxy. While FIG. 1 illustrates only seven double sided intermediate electrodes 37–43, a different number of intermediate electrodes can alternatively be used, and usually at least four.

The end electrodes 35, 36 and the intermediate electrodes 37–43 are generally similar in design, construction and composition, but each intermediate electrode has two sheets of carbon aerogel composite bonded to both sides of a titanium sheet with conductive epoxy, whereas each end electrode has only one sheet of carbon aerogel composite bonded to one side of a titanium sheet with conductive epoxy (illustrated in greater detail in FIGS. 2A and 2B hereinafter). Other porous conductive, monolithic materials can be used for the carbon aerogel composite.

In FIG. 1, the end electrodes 35, 36 and the adjacent intermediate electrodes 37–43 are separated by means of thin sheets of insulating material, such as rubber gaskets 50–56. Each gasket has a large, rectangular aperture in the center to accommodate adjacent carbon aerogel composite 44 on the electrodes. As shown in FIGS. 2A, B an electrode providing structural support, i.e., electrode plate 40a, includes a plurality of peripheral holes 48. When the battery 30 is to be assembled, the peripheral holes 48 are coaligned with corresponding peripheral holes in the insulation layers 33, 34 and the rubber gaskets 50–56, and a plurality of threaded rods 58, 59 are inserted through these coaligned holes, and are tightened by conventional means, such as nuts 60–63. Non-compressible, insulating, hollow, cylindrical spacers or compression rings 50a (shown in FIG. 2A) can be inserted in the peripheral holes of the rubber gaskets 50–56, and used to control the spacing of adjacent electrodes such that adjacent electrosorption materials within each cell are not in physical contact during operation. A plurality of compression sleeves 64a, 64b can be added to provide additional force for sealing.

While only two threaded rods 58, 59 are shown in FIG. 1, in this particular example, several (e.g., eight) threaded rods are used to tighten the battery 30 to a leak proof state. Such rods are designed to fit through the peripheral holes 48 in the structural support 40, as well as through the corresponding peripheral holes (eight shown) in the rubber gaskets 50–56 (e.g., gasket 50) fitted with hollow-cylindrical spacers 50a shown in FIG. 2A.

Once the battery 30 is assembled, a plurality of chambers 65–71 are formed between the end and intermediate electrodes 35–43. These chambers 65–71 are adapted to fluidly communicate with each other via a plurality of apertures 73–79 in the structural supports of the intermediate electrodes 37–43, respectively. These apertures 73–79 are not coaligned, and may be either holes or slits. They are positioned so that the fluid path therethrough, within the chambers 65–71, is forced to flow across all the exposed surfaces of the carbon aerogel composite 44 of electrode 40. In FIG. 1, the fluid first flows from left-to-right, then from right-to-left, and so on.

Figure 2A:
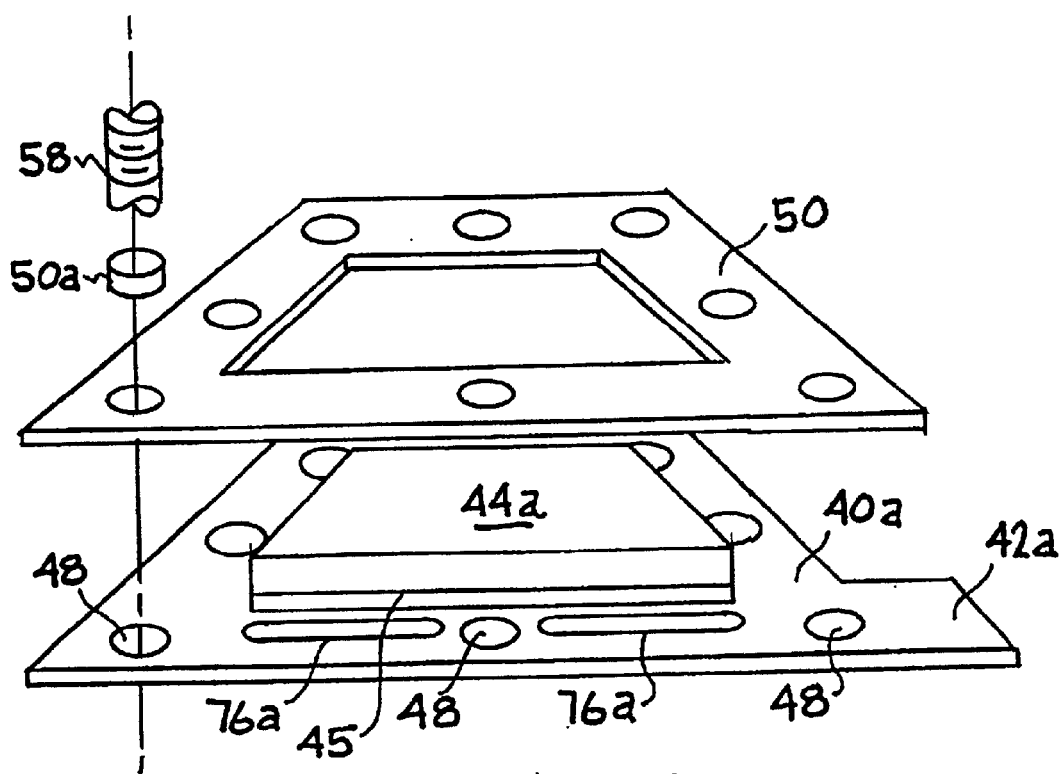
FIG. 2A is an enlarged view of a electrode, adapted for use in the electrochemical cells of FIG. 1.

More particularly, FIG. 2A shows one side of an electrode plate 40a, which includes a generally flat, thin rectangularly shaped, corrosion resistant, metallic (i.e., titanium or other functionally equivalent) sheet, i.e., electrode structural support 40 in FIG. 1. Electrode plate 40a includes an extended portion 42a for electrical current contact to an exterior electrical circuit and peripheral elongated apertures 76a (e.g., slotted openings) which restricts the flow of the electrolyte and fluid to the interior of the battery of cells yet allows the fluid and electrolyte flow to serpentine to the next successive anode/cathode cell in the battery. A single sheet of carbon aerogel composite 44a is bonded to one side of titanium electrode plate 40a where a conductive epoxy or other appropriate bonding material 45 is applied to the whole surface of the carbon aerogel composite 44a that is in contact with the metallic (titanium, etc.) electrode plate 40a which is capable of functioning as a current collector. The other side of electrode plate 40a can include a similarly-shaped carbon aerogel composite such as that described above (i.e., 44a) which is bonded to the surface of the metallic current collector (e.g., 40a) in a similar fashion. The aerogel bonded electrode plate 40a can be used either as an anode or as a cathode depending on the its respective location in the plurarity of cells.

Preferably, the thin layer of high surface area material 44a contains a composite material formed by impregnating a carbon cloth with carbon aerogel, wherefore, the thin layer 44a can also be referred to as carbon aerogel composite electrode 44 in FIG. 1. The new use of this carbon aerogel composite electrode 44 relies primarily on the unique open-cell nanostructure of the carbon aerogel material, including its interconnected porosity, ultrafine pore sizes and huge surface area.

Carbon aerogels are synthesized by the polycondensation of resorcinol and formaldehyde (in a slightly basic medium), followed by supercritical drying and pyrolysis (in an inert atmosphere). This fabrication process results in unique open-cell carbon foams that have high porosity, high surface area (400–1000 m2/g), ultrafine cell/pore sizes (less than 50 nm), and a solid matrix composed of interconnected colloidal-like particles or fibrous chains with characteristic diameters of 10 nm. The porosity and surface area of aerogels can be controlled over a broad range, while the pore size and particle size can be tailored at the nanometer scale. The carbon aerogels further offer both low density and ultrasmall cell size.

While the best mode of the present invention utilizes thin sheets of carbon aerogel composite as electrodes, beds of carbon aerogel particles can alternatively be used to form electrodes. Such beds of carbon aerogel particles have much higher specific area and sorption capacity than beds of conventional carbon powder, and therefore they are superior electrodes for capacitive deionization.

Figure 2B:
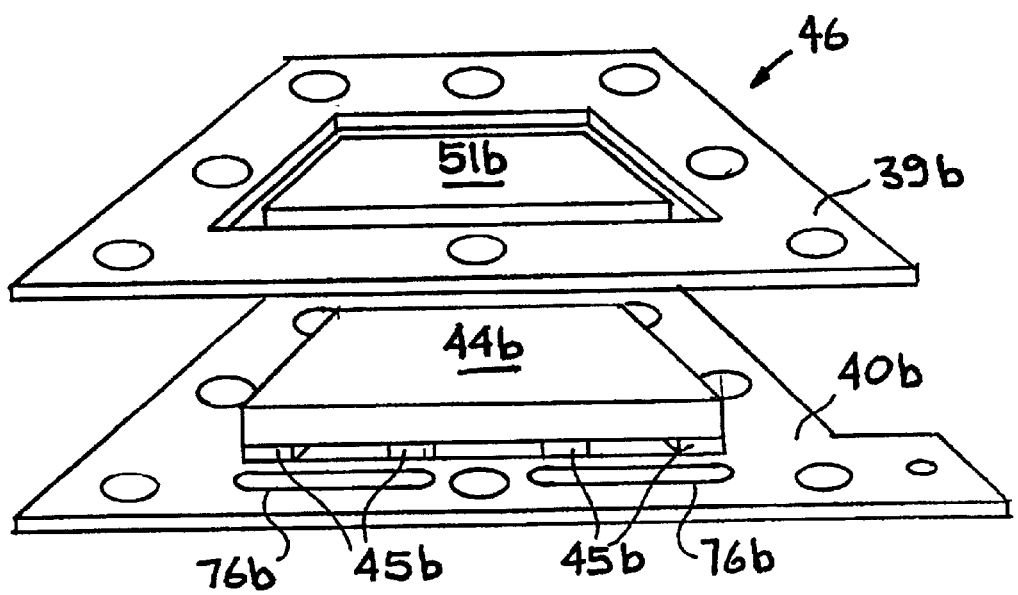
FIG. 2B is an enlarged view of a modified electrode and an associated spacer between a pair of two modified electrodes, adapted for use in the electrochemical cells of FIG. 1.

FIG. 2B illustrates a preferred embodiment including a modified electrode 46 having an electrode plate 40b stacked adjacent to an additional spacer 51b located within a rubber gasket 50b In this embodiment, an improved electrode fabrication method is employed in which an conductive epoxy or other appropriate bonding material is applied to restricted and pre-determined strips 45b of the surface of the carbon aerogel 44b that is in contact with the metallic current collector, e.g., electrode plate 40b. Four 0.625 cm wide strips 45b of commercial conductive epoxy were used to bond the aerogel sheet 44b to electrode plate 40b—the metallic conductor. In this case, additional carbon aerogel surface area is allowed to contact the electrolyte and thus increase the electrode capacity. The thin strips of epoxy also allow fluid channeling beneath the electrode structure and thus facilitate the flow characteristics of the fluid while in residence within each pair of the electrodes. The insulator spacing screen 51b is inserted between electrode plate 40b and a neighboring electrode plate, as for example, between electrodes 40 and 41 in FIG. 1. Electrode plate 40b includes slotted apertures 76b which allow electrolyte and fluid flow between adjacent electrodes. The screen 51b is an insulating material comprising an inert material such as polypropolene, polyethylene or Teflon. Its purpose is to physically separate the two adjacent electrode plates such as electrode plates 40 and 41, to ensure a complete non electrical contact between such electrode plates. The design of such a spacing screen also allows enhanced mixing of the fluid as it flows between the electrode plates.

In operation, and merely for illustration purposes, the anodes and the cathodes of the battery 30 of FIG. 1 are interleaved in an alternating way. In this respect, every other electrode is an anode, starting with the end electrode 35, including intermediate electrodes 38, 40, . . . and ending with the intermediate electrode 43, and the remaining intermediate electrodes 37, 39, 41, . . . and the end electrode 36 are cathodes. Accordingly, each pair of adjacent electrodes (anode and cathode) forms a separate capacitive deionization/regeneration cell.

The stream of raw fluid or electrolyte to be processed enters the battery 30 through a plurality of superposed, coaxially registered, generally circularly or rectangularly shaped openings, including an aperture 80 in the end plate 31, one or more apertures 82 in the insulation layer 33, and the apertures 47 in the end electrode 35. The fluid flows (preferably upward) through the first chamber 65 as indicated by the arrow A, is substantially parallel to the electrode surface. By polarizing the first deionization/ regeneration cell 90, ions are removed from the fluid stream electrostatically, and are held in the electric double layers formed at the carbon aerogel surfaces of the electrodes 35 and 37. This will deionize (i.e, purify) the fluid stream, at least partially.

The fluid stream then flows through the aperture 73 into the next chamber as indicated by the arrow B, where additional ions are removed by the polarization of the second deionization/regeneration cell 91 formed by the intermediate electrodes 37 and 38, thus further purifying the fluid stream. The fluid stream continues to travel through the remaining deionization-regeneration cells, indicated by the arrows C through G, and is progressively purified. Thereafter, as indicated by the arrow H, the purified fluid stream exits the battery 30 via a plurality of coaxially aligned apertures 90, 91, 92 in the end electrode 36, insulator layer 34, and the back plate 32, respectively.

The fluid stream leaving battery 30 is purified since the contamination ions have been removed and collected by the cells of battery 30. One important characteristic of the novel configuration of battery 30 is that the fluid stream does not flow through the porous electrodes, but rather in an open channel, with a relatively low pressure drop (usually less than 5 psig), and with minimal energy consumption for pumping. The energy expended to operate battery 30 is minimal. In this respect, the fluid stream does not necessarily need to be pressurized by a pump to cause it to flow through battery 30; and gravity can be used, if desired.

Also, if the inventive deionization process is used for water desalination, the energy expended is that which is necessary to remove salt from water, whereas in conventional desalting processes, such as evaporation and reverse osmosis, the energy is expended to remove the water from salt. As a result, the present process is orders-of-magnitude more energy efficient than conventional processes.

Additionally, the pressure drop in the capacitive deionization battery 30 is insignificant compared to that needed for reverse osmosis. Also, contrary to conventional deionization processes, the electrodes have a very high and immobilized specific surface area and a high removal efficiency, and the carbon aerogel particles are not entrained by the fluid stream.

As the CDI battery 30 is saturated with the removed ions, the capacitive units become fully charged, and a sensor (not shown) indicates that such condition has been reached, and that battery 30 is ready for regeneration. Contrary to conventional chemical regeneration processes, the present regeneration process is carried out electrically, thus eliminating the secondary wastes. The regeneration process takes place by disconnecting the power supply, by interconnecting the anodes and the cathodes, by electrically discharging all electrodes 15–23, and by flowing a suitable fluid stream of water or another suitable solution through the battery 30, along the same path described above in connection with the deionized stream of raw fluid. As a result, the capacitive cells are discharged through, and release the previously removed ions into the flowing fluid stream, until the battery 30 is fully regenerated, at which time, the regeneration process is stopped and the deionization process restarts. The timing control of the deionization-regeneration process could be manual or automated.

The shape, dimensions and construction of battery 30 and such described electrodes therein are determined by the mode of use and application of the CDI systems. In a preferred embodiment, the end plates 31 and 32 are identical, rectangularly shaped, and made of 316 stainless steel or another appropriate corrosion resistant alloy. The end plates, unlike the electrodes, are not polarized. Other electrode shapes can be used; e.g. cylindrical, circular, or conical.

The insulator layers 33 and 34 are preferably made of an elastic, compressible, insulating, non-leachable material. For example, Teflon, Viton, Neoprene and similar materials are suitable materials for specific applications.

The structural supports of the end electrodes and the intermediate electrodes (e.g., 40 in FIGS. 1 and 2) are preferably made of titanium, or, alternatively they can be selected from a suitable group of materials such as coated, corrosion-resistant, iron-chromium-nickel based alloys. Suitable coatings include gold, platinum, iridium, platinum-iridium alloys, or other corrosion resistant materials.

The carbon aerogel composite electrodes 44, 44a and 44b in FIGS. 1, 2A, B are shown as having, for example, a rectangular shape, and as being centrally positioned relative to the structural supports, e.g., electrodes 40, 40a and 40b, respectively. In the present example, the carbon aerogel composite electrode 44 has dimension, for example, of 10 cm×20 cm, a projected area of 200 cm2, and a thickness of about 0.0127 cm. Other shapes of electrode 44 can be circular, square, or triangular. For example, the Farmer patent describes a square electrode.

While the electrode 44 is preferably made of carbon aerogel composite, any monolithic, porous solid that has sufficient electrical conductivity and corrosion resistance (chemical stability) to function as an electrode, can alternatively be used. Such alternative materials include porous carbon electrodes typically used in fuel cells, reticulated vitreous carbon foams, porous metallic electrodes made by powder metallurgy, packed columns of powder (i.e., packed beds of carbon powder, tungsten carbide powder, various conductive oxides including tin oxide and iridium oxide), a mixture of these and other materials, electrolcatalysts such as Pt, Ir, $SnO_2$, or porous electrodes, that are made by microfabrication techniques, including photolithography, electroforming, physical vapor deposition (evaporation, sputtering, etc.) and etching, and conductive sponges of any type.

The electrode 44 could also be fabricated as a packed bed of carbon aerogel particles. This design offers the advantage of greatly enhanced capacity for electrosorption of ions, adsorption of organics, and capture of fine particles, but would require flow through porous media.

In the event the electrodes become saturated with organic contaminants, it is possible to clean and regenerate the carbon composite electrode 44, or other porous monolithic electrodes by passing solutions of chemically and electrochemically regenerated oxidants, including but not limited to Ag(II), Co(III), Fe(III), ozone, hydrogen peroxide, and various bleaches, through the electrochemical cell 30.

Figure 3:
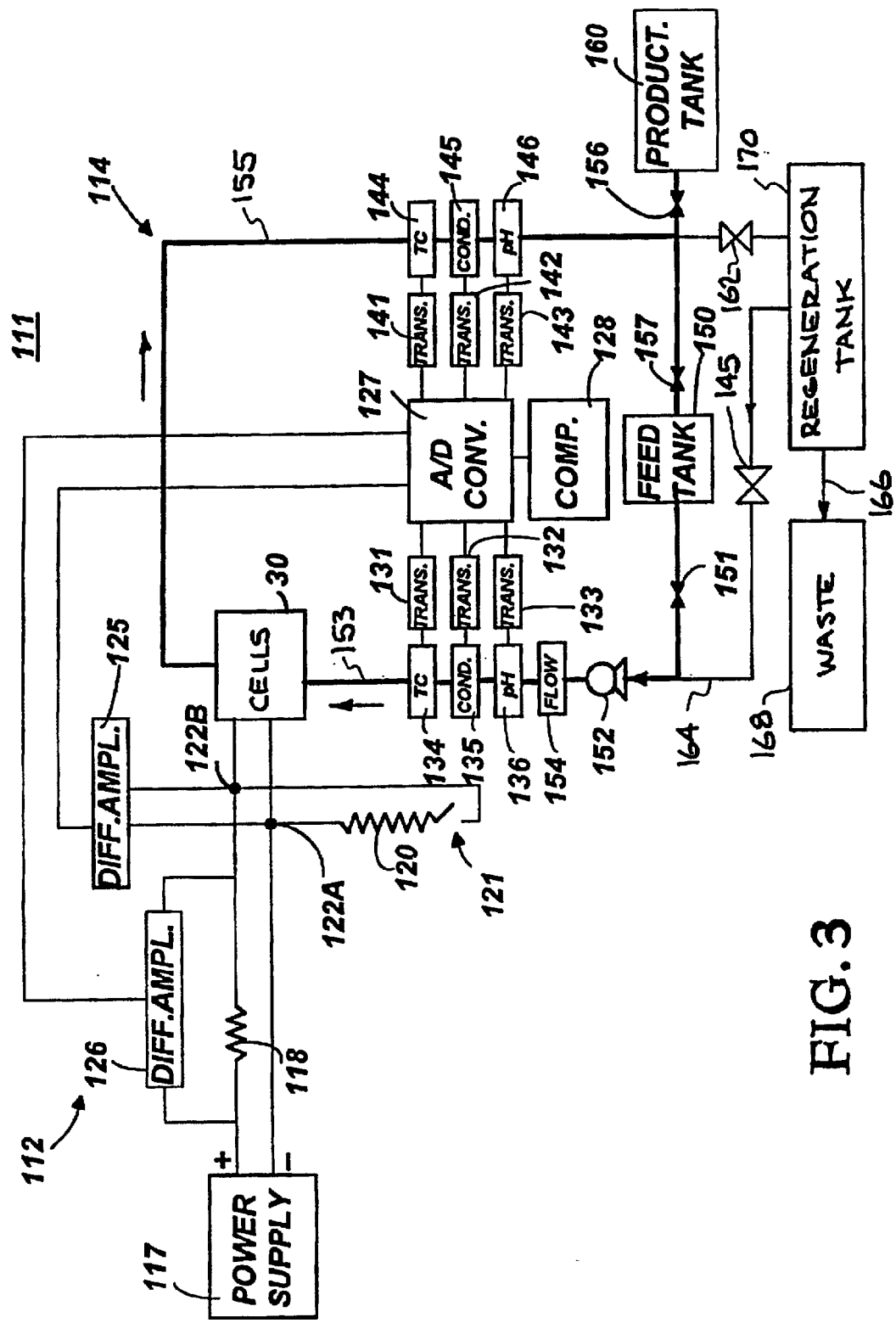
FIG. 3 is a block diagram of a deionization-regeneration system using a representative battery of electrochemical cells shown in FIG. 1.

FIG. 3 illustrates a first embodiment of a capacitive deionization-regeneration system 111 which generally includes one or a stack of sequential (i.e., serial) electrochemical cells (such as those in battery 30 of FIG. 1), an electrical circuit 112, and a fluid circuit 114, such that the fluid circuit 114 regulates the flow of the fluid stream through the cells of battery 30, under the control of the electrical circuit 112.

Electrical circuit 112 includes a voltage controlled D.C. power supply 117 which provides a constant D.C. voltage across the adjacent pairs of electrodes 35–43 (FIG. 1). A resistive load 120 and a switch 121 are connected in parallel, across the positive and negative terminals 122a, 122b, respectively, of the power supply 117, and are used to discharge, i.e., regenerate, the each electrochemical cell of battery 30.

The electrical circuit 112 further includes a control system, as a triggering device to initiate regeneration. This control system utilizes on-line conductivity cells, ion selective electrodes, pH electrodes, polarographic sensors, impedance sensors, optical transmission cells, and light scattering sensors. The components that can be triggered by this on-line control system include power supplies, valves and pumps.

A differential amplifier 126 is connected across a shunt resistor 118, and is further connected to an analog-to-digital converter 127 and a computer 128. The shunt resistor 118 is used to measure the current flowing from the power supply 117 to the cell 30, for monitoring and control. The differential amplifier 126 amplifies the voltage across the shunt resistor 118 to a level that is monitorable by the analog-to-digital converter 127 and the computer 128. Another differential amplifier 125 is connected across the terminals 122a, 122b of the power supply 117, via the shunt resistor 118, and operates as a buffer between the power supply 117 and the analog-to-digital converter 127, for protecting the analog-to-digital converter 127.

The differential amplifier 125 is connected across the terminals of the cell 30, and serves as a buffer between the cells of battery 30 and the A/D converter 127. In operation, as the cells of battery 30 are used to deionize the electrolyte, the switch 121 is open. In order to start the regeneration process, the power supply 117 is turned off, or disconnected, and the switch 121 is closed, for providing a path for the discharge current.

The analog-to-digital converter 127 is connected to the inlet stream of the fluid circuit 114, via a plurality of sensors, such as a thermocouple 134, a conductivity probe 135, and a pH sensor 136, via respective transducers 131, 132, 133. The thermocouple 134 enables the monitoring of the temperature of the inlet stream, in order to prevent the overheating of the electrolyte, and further enables the calibration of the conductivity probe 135. Conductivity probe 135 is an on line sensor which monitors the conductivity of the inlet stream. The pH sensor measures the pH level of the inlet stream. The transducers 131, 132, 133 convert the measurements of the thermocouple 134, conductivity probe 135 and pH sensor 136 into voltages that are readable by and compatible with the analog-to-digital converter 127. A flow rate meter 154 measures the flow rate of the inlet stream.

The fluid circuit 114 includes a feed and recycle tank 150 which contains the raw fluid to be processed by the cells of battery 30. The fluid stored in the feed and recycle tank 150 can be replaced with a continuous inflow of raw fluid. A valve 151 is fluidly connected between the feed and recycle tank 150 and a pump 152. The speed of the pump 152 is used to control the flow rate of the inlet stream to the cells of battery 30. The outlet stream is respectively connected, via two valves 156, 157, to a product tank 160 for storing the purified fluid, and to the feed and recycle tank 150. Valves 156 and 157 are used to select the mode of operation: batch mode or complete recycle; continuous mode or once through.

Similarly to the inlet stream, the analog-to-digital converter 127 is also connected to the outlet stream of fluid circuit 114, via three transducers 141, 142, 143, a thermocouple 144, a conductivity probe 145, and a pH sensor 146.

In the continuous mode of operation, the raw fluid or electrolyte to be deionized is initially stored in the feed and recycle tank 150, and the valve 157 is closed. The pump 152 is activated for pumping the fluid from the feed and recycle tank 150 to the cells of battery 30, where the fluid stream is deionized and purified. The purified effluent is then routed to the product tank 160 via the open valve 156. In certain applications, it would be desirable to recycle the fluid stream more than once, in order to obtain the desired level of purification, in which case, the valve 156 is closed, and the valve 157 is opened, in order to allow the fluid stream to be recycled through the cells of battery 30.

When the cells of battery 30 are saturated, the deionization process is automatically interrupted and the regeneration process starts. For this purpose, the power supply 117 is disconnected or the polarity reversed, and a regeneration tank 170 is fluidly connected to the pump 152 and the cells of battery 30. The regeneration tank contains a suitable regeneration solution (only a relatively small amount is needed and can have the same composition as the feed stream, for instance raw water), or alternatively, pure water can be used. The regeneration solution can be passed through the cells of battery 30 via fluid line 164, and the regeneration process takes place by placing the removed ions back into the regeneration solution through fluid line 114 and 162 and eventually after a desired ion (contaminant) accumulation, is removed in a waste tank 168 through line 166. A continuous operation for processing deionization-regeneration of multiple stacks, i.e., two or more batteries, can be employed, particularly in commercial applications. As the electrodes of one of the batteries become saturated, those of another are almost or completely regenerated, and is ready to proceed with the deionization process. As a result, the deionized or purified fluid stream at the output of the system is continuous.

Figure 4:
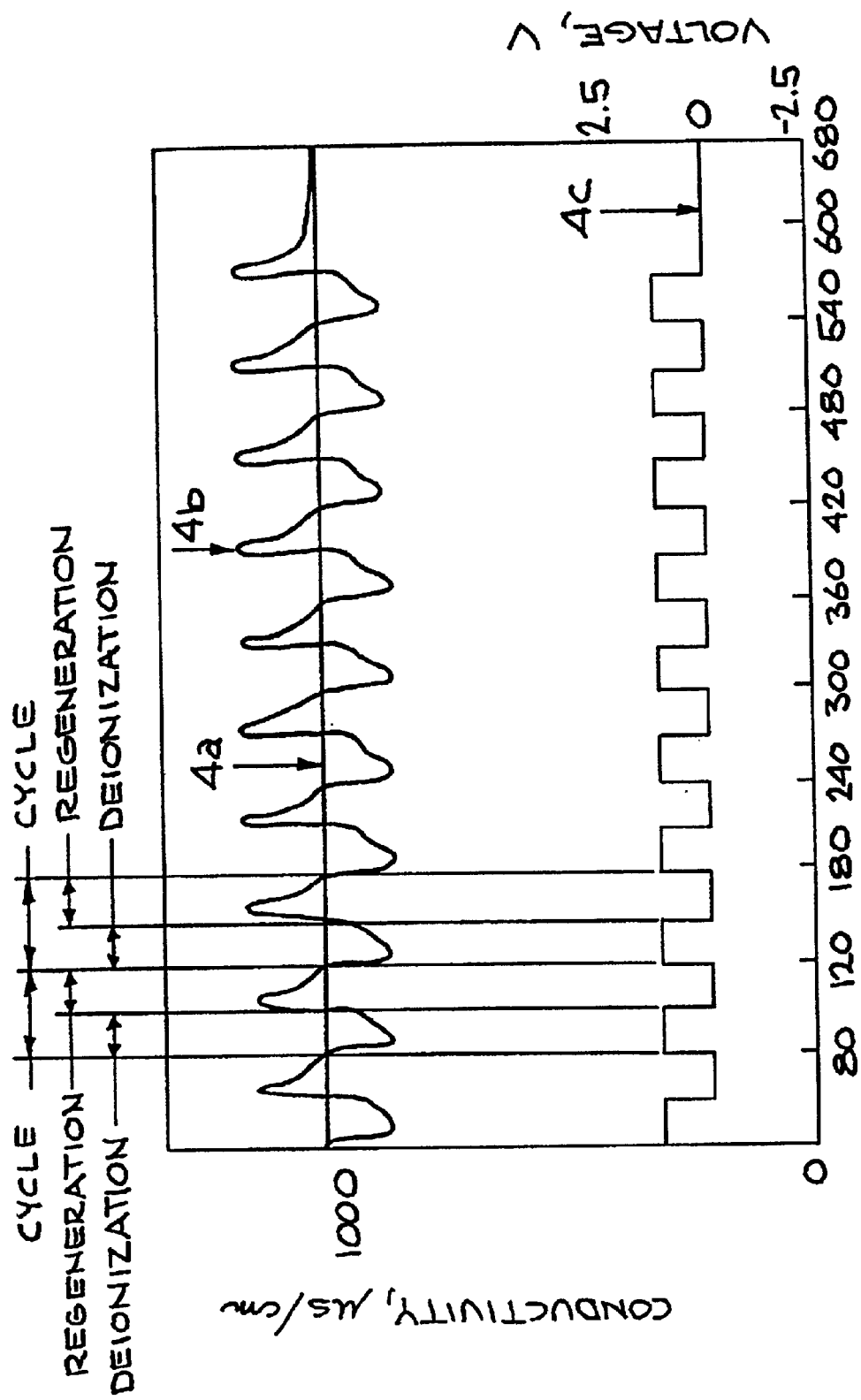
FIG. 4. Performance curve of a system operating in standard procedure for 10 cycles.

FIG. 4 illustrates performance timing charts for ten consecutive cycles including both deionization and regeneration steps in each cycle. A system similar to battery 30 of FIG. 1, but containing a total of 15 electrode pairs (including 13 double-sided, intermediate electrodes) has been used for a continuous deionization and regeneration of 1000 micromhos/cm NaCl solution. Chart 4a represents the conductivity of the feed (inlet) solution. Chart 4b represents the conductivity of the outlet stream. Chart 4c represents the voltage across the 15-cell battery of similar design to battery 30 of FIG. 1. In each deionization step in FIG. 4 wherein the applied voltage is +1.2V, the outlet stream conductivity is reduced relative to the inlet stream conductivity and slowly increased. After 30 minutes, the cells are regenerated whereby the applied voltage across the electrodes is reduced to zero, i.e., the cells are shorted. The outlet conductivity is higher than that of the inlet due to addition of ions being removed from the aerogel electrodes. When the outlet stream conductivity decreases to a level approaching that of the inlet stream, the voltage is again applied to the cells and the second deionization step commenced at an applied voltage of +1.2V.

Figure 5:
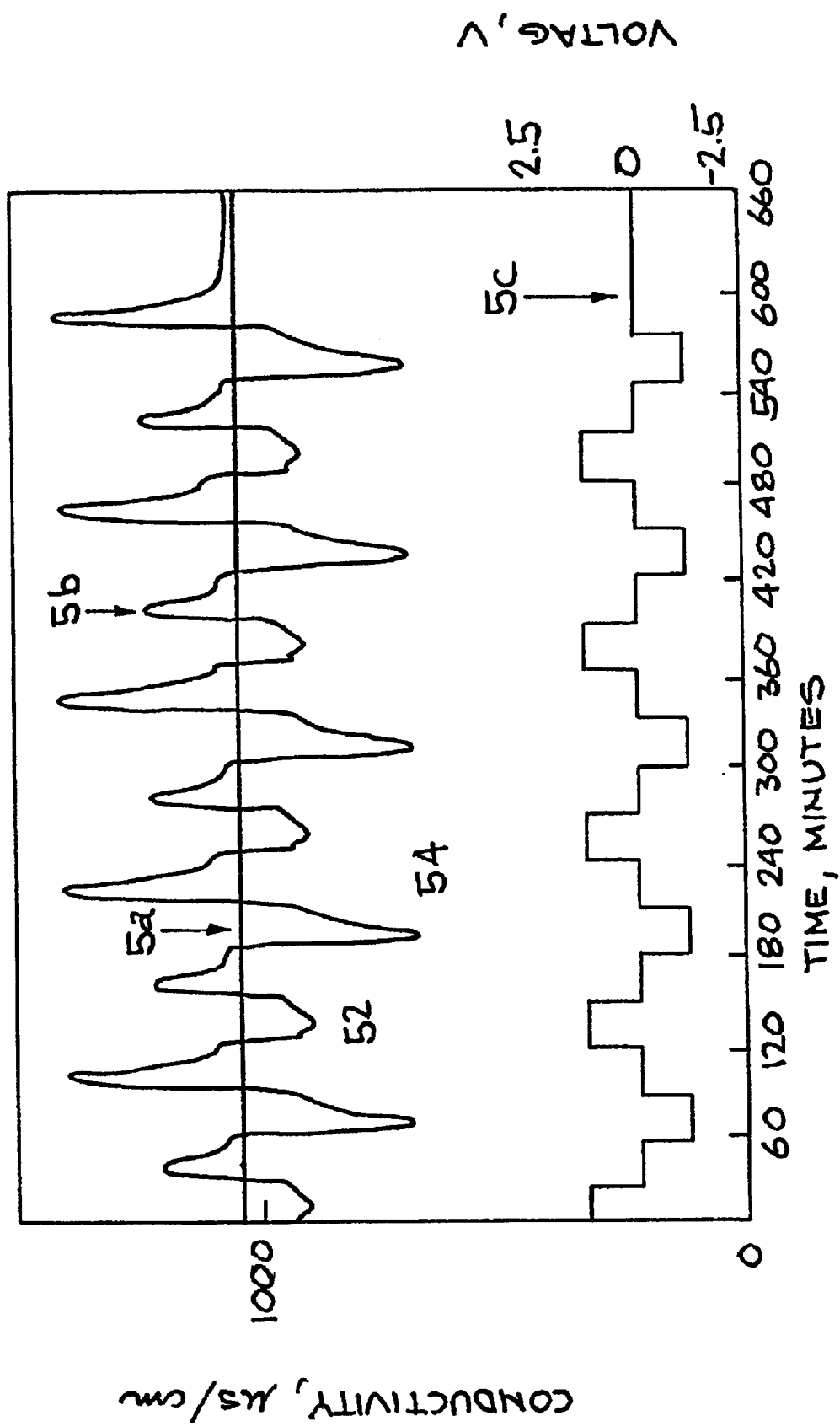
FIG. 5. Performance curve of the inventive system wherein the deionization step of each cycle is operating in alternating polarity for 10 cycles at 1.2V.

The performance timing charts of FIG. 5, further described hereinafter in Example 1, illustrate a preferred embodiment of this invention involving a continuous deionization and regeneration of the deionization process whereby the applied voltage is reversed at alternating deionization steps. The technique can be applied at any time in the operation of the system and depending on the degree of degradation of the system, maintaining high performance and/or enhancement of existing total ion removal capacities can be expected. Surprising improvements of the present invention result from modification of product tank collection and electrode fabrications.

Such a capacitive deionization-regeneration system of the invention includes a battery of at least four electrochemical cells with each cell having at least one pair of adjacent electrodes having electrosorptive media with high specific surface area and sorption capacity that is formed on one or more surfaces of such electrodes. Each pair of the adjacent electrodes have at least one aperture and each pair of the adjacent electrodes form an open channel that is adapted to fluidly communicate with a subsequent open channel via the aperture in order to allow a fluid to flow across the electrosorptive media and through the battery in a serpentine path. An electrical circuit is use for controlling the operation of the battery of cells and is adapted for switching the polarity (i.e., reversing the voltage) of each pair of the electrodes during each successive deionization cycle of the cell. A fluid circuit is also employed for regulating the flow of the fluid through each cell under the control of the electrical circuit, in order to maintain a continuous deionization and regeneration operation. Each full cycle of the system includes a first deionization step followed by a subsequent regeneration step. The cells are preferably electrostatically regenerated in the regeneration step of a full cycle at a voltage reversal of potential up to about that of the previous deionization step, and thus allowing the subsequent deionization step in the next full cycle to be maintained, without need of switching, at the same level of voltage potential as the previous regeneration step.

The voltage applied to the cells of the present inventive methods and systems is generally from about 0.8 V to about 2.0 V, and usually from about 1.0 V to about 1.7 V. Performance timing charts of FIG. 6, also from the hereinafter-described Example 1, illustrate a preferred embodiment of the invention involving the application of the voltage reversal at alternating deionization steps at potentials higher than conventional practical limit where it has been recognized that significant gas evolution can occur due to the hydrolysis of water. For example, in a capacitive deionization-regeneration system of the invention involving an aqueous feed solution where the breakdown voltage of water has been known to be about 1.2V, a voltage reversal can be applied to the battery of cells at alternating cycles at greater than 1.2V, even greater than 1.4 V, and in some instances greater than 1.6 V, and can still produce enhanced ion removal capacity while maintaining the performance of the multiple-cell system at a stable level. The ion removal capacity of the system can be maintained at the same or enhanced levels depending on the age and the degree of degradation of the conductive, high surface area electrodes.

The continuous deionization-regeneration at alternating polarity does not exclude the possibility of an novel operation involving the progressive and selective deionization and regeneration feature. Different potentials (V1, V2, Vn) can be applied across each system such as one shown in FIG. 1 in order to selectively deionize the influent fluid stream, by having each system remove different ions from the fluid stream.

In one embodiment, a heavy organic solvent is used to dissolve heavy organic fouling, followed by a strong chemical oxidant such as ozone, hydrogen peroxide, Fenton's reagent, silver (II), cobalt (III), iron (III), or peroxydisulfate (S2O8-2). These oxidants can oxidize very thin layers of organic contaminants that have been chemisorbed to the surface of the electrode, thereby regenerating the electrode. Thus, an important aspect of the present invention is that the carbon electrodes are chemically resistant and regenerative.

The periodic reversal of the electrode potential at alternating cycle can permit the electrode to regenerate very effectively and to prevent additional deposition of the deposited species to a more stable and therefore irreversible surface species. The regeneration of the electrode can prolong the effective life of the electrode and cells, and can lower the maintenance and operating cost. Remarkably, by alternating deionization polarities for consecutive deionization/regeneration cycles for overall battery operational periods in excess of one month, the time of regeneration of the electrodes can be reduced to less than 1.1 times that of the deionization time, and preferably 1.05 or less times that of deionization periods. In a highly preferred embodiment, the regeneration time is essentially equal to that for deionization and the system can still operate for more than three months without replacement or rejuvenation of the electrodes. Periodic voltage reversal can be done while passing a feed stream through the cells, or while passing chemical regenerant (acid, base, etc.) through the cells.

The present invention are applicable to systems containing other types of carbons and/or carbon-based materials, including carbon aerogel, reticulated vitreous carbon foam and carbon powder. They include a number of metallic carbides that can be in the form of powders, particles, foams, sponges, or porous solids made by flame spraying or powder metallurgy, sputtered thin films, or formed by other processes. These carbides include TiC, ZrC, VC, NbC, TaC, UC, MoC, WC, MO2C, Cr3C2, Ta2C, and similar carbides that are stable at high temperatures, chemically resistant, and highly conductive with a resistivity ranging between about 17·ohm-cm and 1,200·ohm-cm.

The method of the invention and the capacitive deionization system and present significant improvements and advantages over other technologies. For instance, unlike ion exchange, no acids, bases, or salt solutions are required for regeneration of the system. Regeneration is accomplished by electrically discharging the cells. Therefore, no secondary waste is generated. Since no membranes or high pressure pumps are required, the present system offers operational advantages over electrodialysis and reverse osmosis. It is more energy efficient than competing technologies, and is substantially more energy efficient than thermal processes.

The present system can also be used to treat brackish water (800 to 3200 ppm), which is very important, particularly to coastal communities. Competing technologies for the treatment of brackish water are electrodialysis and reverse osmosis. These processes consume about 7.7 Wh/gal and about 5.3 to 8.5 Wh/gal, respectively. The present system is much more energy efficient, and may require less than 1 wh/gal, possibly 0.2–0.4 Wh/gal, depending upon energy recovery, cell geometry, and operation.

The system eliminates costly and troublesome membranes. A carbon aerogel CDI system has additional cost advantages over electrodialysis and reverse osmosis since expensive and troublesome membranes are eliminated.

The system also eliminates wastes from chemical regeneration. A carbon aerogel CDI system could be used for home water softening, the treatment of hazardous and radioactive wastes, the deionization of boiler water for steam and power generation, and the production of ultra pure water for manufacturing.

Commercial Applications

The present separation processes and systems have several important applications, including:

1. Removal of various ions from waste water without the generation of acid, base, or other similar secondary wastes. This application may be especially important in cases involving radionuclides, where the inventive capacitive deionization process could be used to remove low-level radioactive inorganic materials.

2. Treatment of boiler water in nuclear and fossil power plants. Such treatment is essential for the prevention of pitting, stress corrosion cracking, and scaling of heat transfer surfaces. Such a process may be particularly attractive for nuclear powered ships and submarines where electrical power is readily available and where there are space limitations, thereby restricting the inventory of chemicals required for regeneration of ion exchange resins.

3. Production of high-purity water for semiconductor processing. In addition to removing conductivity without the addition of other chemical impurities, the system is capable of removing small suspended solids by electrophoresis. Furthermore, the organic impurities chemisorb to the carbon.

4. Electrically-driven water softener for homes. The CDI system would soften home drinking water without the introduction of sodium chloride, and does not require salt additions for regeneration.

5. Removal of salt from water for agricultural irrigation.

6. Desalination of sea water.

By using the CDI separation systems of the present invention, it is now possible to remove organic and inorganic contaminants and impurities from liquid streams by the following physiochemical processes: the reversible electrostatic removal of organic or inorganic ions from water or any other dielectric solvent; the reversible or irreversible removal of any organic or inorganic impurity by any other adsorption process, including but not limited to underpotential metal deposition, chemisorption, and physisorption; the removal of any organic or inorganic impurity by electrodeposition, which could involve either electrochemical reduction or electrochemical oxidation; and the electrophoretic deposition and trappings of small suspended solids, including but not limited to colloids, at the surface of the electrodes. Induced electric dipoles will be forced to the electrode surfaces by the imposed electric field.

The foregoing description of the embodiments of the present invention has been presented for purposes of illustration and description. It is not intended to be exhaustive or to limit the invention to the precise forms described.

EXAMPLE 1

In a series of 6 runs (Runs A through F), Runs B and D are conducted to illustrate the unusual aspects of the inventive alternating polarity operation. A comparative study of the efficiency and capacity improvements of the alternating polarity system of the invention is demonstrated with respect to (1) the serpentine embodiment of the invention, i.e., Run B, (2) an improved electrode construction of the invention, i.e., Run D, and (3) a flow-through, short-path design applying the principles disclosed in U.S. Pat. Nos. 5,779,891 and 5,620,597 issued to Andelman (herein known as "Andelman"), i.e., Run E.

In a capacitive deionization-regeneration system of the invention similar to that of the serpentine system disclosed herein before (Run B) is operated over ten (Nos. 1 through 10, inclusive) cycles. Each cycle includes a deionization (purification) step and a regeneration step, and the battery of electrochemical cells similar to that in FIG. 1 has a total of 15 pair of spaced apart anode-cathode electrodes including (a) 14 double sided adjacent intermediate electrodes and (b) 13 of the 15 anode-cathode pairs having no dimension open to the exterior of the stack (only the anode-cathode pairs receiving inlet fluid and outletting treated fluid open to the exterior). In each cycle of the runs (A–F) each deionization and regeneration step is limited to 30 minutes and conducted at + or −1.2 V (depending upon which successive cycle), and 0.0 V, respectively. (The 30 minute selected time is not considered optimum.) Each deionization step is immediately followed by each regeneration step which is followed by the next deionization step etc., Deionization steps of cycle Nos. 1, 3, 5, 7 and 9 are each operated at a positive voltage (i.e., +1.2 V) and the alternating deionization steps, i.e., of cycle Nos. 2, 4, 6, 8 and 10, are each operated at an equivalent negative voltage (i.e., −1.2 V). All ten regeneration steps (in all the runs A–F) are all operated by shorting the cells, i.e., operating at 0.0 voltage. FIG. 5 illustrates the performance timing charts for the feed and product solutions of Run B of the invention. Chart 5a represents the conductivity of the feed streams. Chart 5b represents the conductivity of the product stream. Chart 5c indicates the applied voltages during each portion of the cycles. In runs A, B, E, and F, the entire backing surface of the carbon aerogel composite electrodes are attached to titanium sheets by conductive epoxy. The average capacity and accumulated capacity of the electrodes in a run of this inventive system (Run B) is measured over the ten deionization steps and ten regeneration steps and summarized in Table 1 below during the treatment of a 1000 micromhos/cm NaCl aqueous solution of electrolyte (equivalent to 600 mg NaCl per liter of water).

Another capacitive-deionization-regeneration serpentine system of the invention, i.e., Runs C & D, comparable in all aspects to Runs A and B above, except the electrodes being attached by four strips of conductive epoxy-thus exposing a greater surface area of carbon aerogel composite electrode to electrolyte, is operated under comparable alternating deionization voltage conditions as above in Run B, with results summarized in Table 1 below. Another means for attaching the aerogels to the titanium plate is employed in Run D. In such modified electrodes (electrode design in FIG. 2B), the aerogel sheets are attached to the titanium plates through four thin 20 cm×0.625 cm strips of conductive binder. The adhesive is a two-part commercial conductive epoxy (90705, Magnolia Corp.) An insulator mesh spacer is located between each pair of anode/cathodes. Charge/discharge experiments with these electrodes demonstrate robust conductive behavior, comparable to those described above in Run B, where the epoxy filled the carbon aerogel/Ti interface completely. Since these modified electrodes do not have a filled backside, it is illustrated that a certain flow-through characteristic occurs in these electrodes during operation. The unexpected regeneration behavior demonstrated by the modified electrodes is illustrated in Run D of Table 1.

A short path, flow-through capacitor system applying the principles disclosed in the Andelman system, is tested in Run F in the same manner and under comparable conditions to those above in Run B of the invention (i.e., + or −1.2 V, alternating only the purification cycle, shorting for regeneration, same electrode surface areas as in Run B of the invention). Specifically, the short path system and apparatus of Andelman differs from the system and apparatus of the invention wherein the open flow path between each pair of electrodes in Andelman has at least one dimension open to the exterior of the capacitor. As related to FIG. 1 of the present invention wherein chambers 65–71 are fully adapted to fluidly communicate with each other via a plurality of apertures 73–79 which allow the fluid stream containing electrolyte to flow into successive chambers within the battery (in a long serpentine path) as indicated by flow letters B. C, D, E, F, and G (FIG. 1), the short flow path of the apparatus of Andelman is analogous to chambers 66–70 having apertures allowing the fluid stream containing electrolyte to flow outside the apparatus through, for instance, apertures in rubber gaskets 50–56. In a representative Andelman system, the fluid stream is input through apertures in such gaskets before flowing across the single short path between a pair of electrodes and then output through similar apertures. Run E operates with alternating polarities during successive purification cycles at + or −1.2 V in the same manner as Run B of the invention, both runs having equivalent electrode surface areas for adsorption and desorption of electrolyte. Average and accumulated capacities of Run E are summarized below in Table 1.

The capacity and regeneration improvement features of the invention are also illustrated in Runs G through L vs. Andelman at a voltage above 1.2, even above 1.4, e.g. 1.6 volts. Such features of the invention are illustrated in Runs J and L. The poorer performances of the Andelman short-path system operating at 1.6 V is again illustrated in Run H.

Furthermore, comparable reference Runs A, C and E (1.2 V) and reference Runs I, G and K (1.6 V) are operated under comparable conditions as in Runs B, D and E (1.2 V) and as in Runs J, H and L (1.6 V), except all ten purification cycles (Nos. 1 through 10, inclusive) are operated only at the positive voltage. FIG. 4 illustrates the performance timing charts for the feed and product solutions of Run A. Chart 4a represents the conductivity of the feed streams. Chart 4b represents the conductivity of the product stream. Chart 4c indicates the applied voltages during each portion of the cycles. Such comparative reference runs are illustrative of the conventional "positive-only voltage" deionization systems described, for example in the Farmer system. Average and accumulated capacities of the runs are summarized below in Table 1.

TABLE 1

| Operating Voltage: 1.2 V[1] | Invention cell (serpentine) | | | | Mod. inv. cell (serpentine + stripped epoxy) | | | | Andelman cell (short path) | | | |
|---|---|---|---|---|---|---|---|---|---|---|---|---|
| Run | A Positive only | | B Alternating | | C Positive only | | D Alternating | | E Positive only | | F Alternating | |
| Average capacity | Purif | Regen | Purif | Regen | Purif | Regen | Purif | Regen | Purif | Regen | Purif | Regen |
| mg NaCl equi. | −63 | 56 | −109 | 114 | −150 | 150 | −250 | 244 | −66 | 55 | −48 | 50 |
| Accumulative capacity for 10 cycles (mg NaCl equi.) | −630 | 560 | −1091 | 1145 | −1510 | 1520 | −2500 | 2440 | 660 | 550 | −530 | 560 |
| % change | | −11 | | 5 | | 0 | | −2 | | −17 | | 6 |
| Operating Voltage: 1.6 V[2] | Invention cell (serpentine) | | | | Mod. inv. cell (serpentine + stripped epoxy) | | | | Andelman cell (short path) | | | |
| Run | I Positive only | | J Alternating | | K Positive only | | L Alternating | | G Positive only | | H Alternating | |
| Average capacity | Purif | Regen | Purif | Regen | Purif | Regen | Purif | Regen | Purif | Regen | Purif | Regen |
| mg NaCl equi. | −128 | 116 | −184 | 183 | −260 | 280 | −370 | 380 | −138 | 120 | −112 | 120 |
| Accumulative capacity for 10 cycles (mg NaCl equi.) | −1030 | 930 | −1470 | 1470 | −2600 | 2800 | −3700 | 3800 | −1360 | 1200 | −1162 | 1218 |
| % change | | −10 | | 0 | | 7 | | 3 | | −11 | | 5 |

[1]Positive only = Purification for 30 min. at +1.2 V, Regeneration at short circuit (0.0 V) 30 min.; 30" @ +1.2 V, 30" @ 0.0 V, . . .
Alternating = Purification for 30 min. at +1.2 V, Regeneration at short circuit (0.0 V) 30 min.; Purification for 30" @ −1.2 V, Regeneration for 30" @ 0.0 V; Purification for 30" @ +1.2 V; Regeneration for 30" @ 0.0 V, . . .
[2]Same operation as [1] except at 1.6 V The data in Table 1 indicate that the average capacity (per cycle) and accumulated capacity (for 10 cycles) for the alternating polarity operation of the invention at +1.2 V and −1.2 V (Run B) for deionization is considerably higher than that of the comparable positive-only polarity system (Run A), i.e., −109 and −1091 mg NaCl equiv. vs. −63 and −630 mg NaCl equiv., respectively. (Negative values indicate salt removed from solution during the deionization step whereas positive values indicate salt added to the solution during the regeneration process.) Of more significance in Run B, the regeneration step for the invention (+114 and +1145 mg NaCl equiv.) exhibits substantially greater restoration of capacity than is shown (Run A) in the comparable positive-only system (i.e., +56 and +560 mg NaCl equiv.).

The data in Table 1 also indicate that the average capacity (per cycle) and accumulated capacity (for 10 cycles) for the alternating polarity operation of the invention at +1.2v and −1.2 v (Run B) for deionization is considerably higher than that of the comparable Andelman system (Run F), i.e., −109 and −1091 mg NaCl equiv. vs. −48 and −530 mg NaCl equiv., respectively. Of even more significance in Run B, the regeneration step for the invention (+114 and +1145 mg NaCl equiv.) exhibits substantially greater restoration of capacity than is shown (Run F) in the comparable Andelman system (i.e., +50 and +560 mg NaCl equiv.).

Furthermore, Run D of the invention, also operating at 1.2 V, exhibits at least 2 and even greater than 4 times the purification and regeneration capacities with modified electrodes of FIG. 2B that allow for greater surface area than those used in Runs A–B and E–F. Such results demonstrate a non-linear increase in capacity that cannot be attributed to either a simple increase in surface area alone or due to alternating polarity.

Deionization and regeneration capacities at an operational voltage above 1.2 v, and further above 1.4 v, (which approach those in which electrolysis of water occur), such as those capacities exhibited at 1.6 V in Runs J and L of the invention, demonstrate the effective nature of alternating polarity during each deionization step as compared to non-alternating systems (positive-only) in Runs I and K, respectively. At the 1.6 operational voltage, the invention exhibits substantial improvement compared to the Andelman system, i.e., Run J vs Run H. y conditions. The deionization capacities of such system represent a 460% increase over conventional practice and battery 30. The nonlinear increase in the capacities and the stable capacity over multiple cycles are One unusual effect of alternating the polarity of each consecutive deionization step is increased deionization capacity of the electrodes on alternating cycles of capacitive deionization, especially when applied to aged electrodes or battery systems. Such advantageous effects are evident in FIG. 5. FIG. 5 illustrates a high-capacity cycle being followed by a reduced-capacity cycle, and so on. Peak 54 represents the conductivity curve for the deionization step of cycle 4 during the alternating voltage operation at −1.2 V. This indicates a nearly 100% larger capacity compared to the deionization capacity obtained during the previous deionization step of cycle 3 (represented by peak 52) operated at +1.2V. Such general effects remain for subsequent cycles in this run; however, it has been observed that the capacities of the reduced-capacity cycles increase in the direction of the capacities of the high-capacity cycles during the continued course of operation of this capacitive-deionization system for extended periods of time. Accordingly, the capability of restoring capacity during the regeneration step is also observed in the same manner as in the deionization step.

Figure 6:
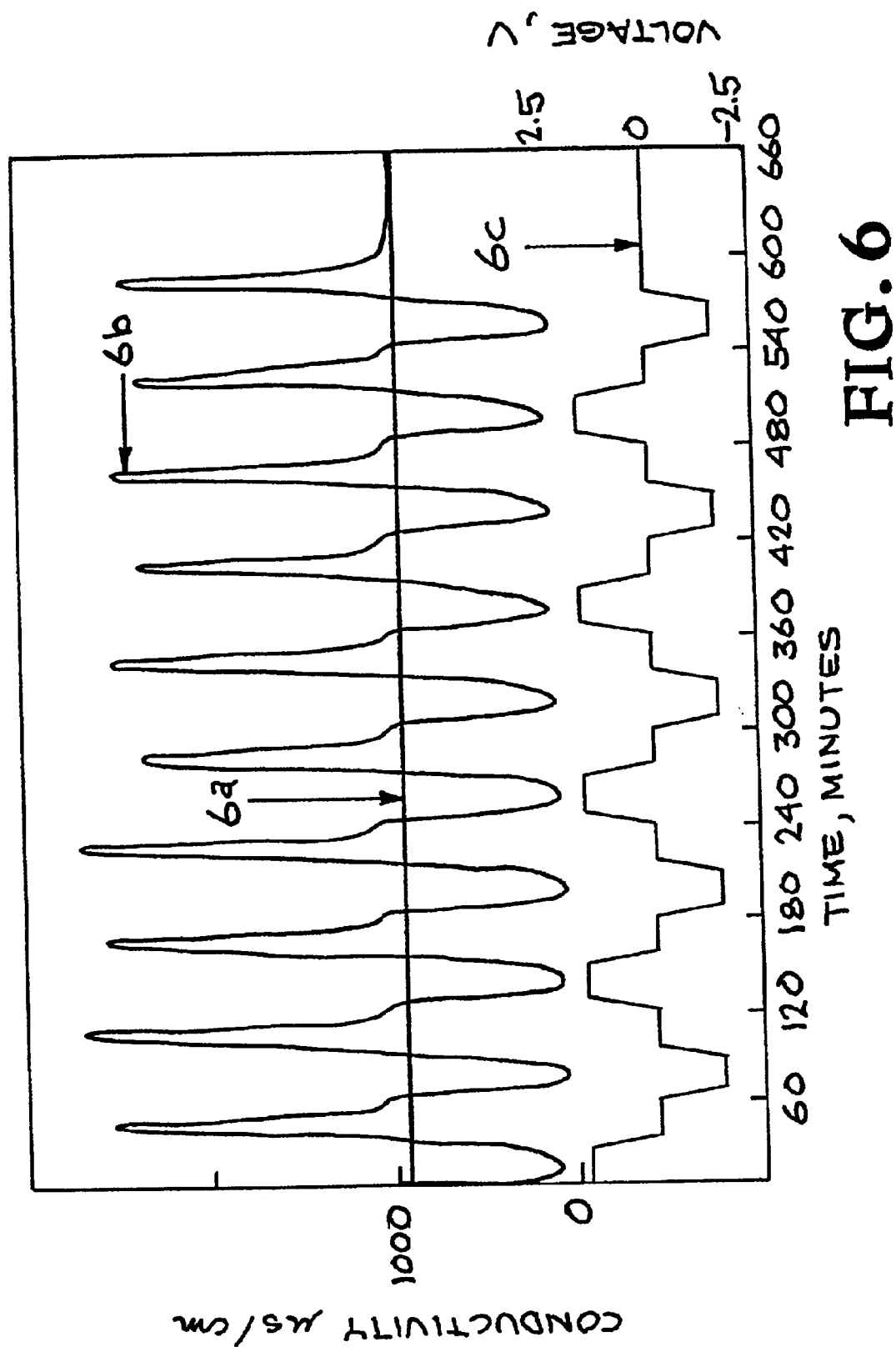
FIG. 6. Performance curve of the inventive system wherein the deionization step of each cycle is operating in alternating polarity for 10 cycles at 1.6V.

Another unusual aspect of the invention is illustrated in FIG. 6. Chart 6b represents the outlet conductivity for 15-cell unit of similar construction of battery 30 but containing electrodes and additions described in FIG. 2B. A four striped epoxy and additional screen mesh were employed in this unit. The operating voltage of such unit is 1.6V under alternating polaritunique features of this inventive apparatus and approach.

EXAMPLE 2

A run of 11 consecutive deionization-regeneration cycles is conducted to illustrate an unusual aspect of the alternating polarity operation of the invention. Two electrochemical deionization-regeneration batteries of the invention similar to that of battery 30 (FIG. 1) except that each battery containing 150 pairs of electrodes are used. In this system, the entire backing surface of the carbon aerogel composite is attached to the titanium sheet by conductive epoxy (FIG. 2A). A total of 134 liters of aqueous solution containing 800 mg/liter of NaCl is inleted as the raw fluid stream. The initial conductivity of the solution is recorded at about 1250 micromhos/cm. The purified water product conductivity is intended to be 500 (or less) micromhos/cm (i.e., equivalent to about 300 or less mg NaCl/liter). Also, the total volume of the waste solution is minimized and its conductivity maximized. Each cycle includes both a deionization (purification) step and a regeneration step. Each deionization step is operated to maintain the outlet conductivity below 500 micromhos/cm or until the ion removal capacity for the 150-cell battery is reached. Because of the small battery system used in this example, the deionization and regeneration are done using a batch (recycled) mode and that the solution at the end of each deionization or regeneration step is removed from the system quantitatively before the next step is initiated. Under these arrangements, the mixing between the purified product and the feed solution used for the regeneration portion of each cycle is minimized. Although the limited capacity of this small battery system is exemplary, its applicability can readily be extended to large-scale and automated commercial systems. A practical commercial process involving multiple streams employing several batteries with automated control can be envisioned which ensure continuous, interrupted processing of a feed solution to one or multiple purified products of any desirable conductivity (i.e., salt concentration).

For each deionization step, a total of 14 liters of feed solution is recycled through the two 150-cell battery charged at 1.6V for an average time between 2–4 hours until the product conductivity drops to or below 500 micromhos/cm. At the end of such a deionization cycle, the total product solution is recovered quantitatively. Another (i.e., a second untreated) 14 liter quantity of feed solution is recharged to the battery system and the cells are discharged to at 0.0 V and left overnight without additional energy applied for a duration between 4–16 hours. The regeneration is arranged judiciously in such fashion to allow intimate operator participation and does not suggest practical application. Data illustrated in Example 1 indicate that a similar time for deionization is sufficient for regeneration. For example, an average time between 2 and 4 hours is considered sufficient for regeneration. At the end of regeneration, the regenerant/waste solution is recovered quantitatively and reused in the next regeneration cycle so the volume of the waste is minimized. In the following deionization cycle, the voltage applied to the serpentine 150-cell battery system is reversed to −1.6V. Deionization cycles Nos. 1, 3, 5, 7, etc. are each operated at a positive voltage (i.e., 1.6 v) and the alternating deionization cycles, i.e., Nos. 2, 4, 6, 8, etc. are each operated at an equivalent negative voltage (i.e., −1.6 v). All regeneration portions in each cycle (in all the runs) are all operated by shorting the cells, i.e., operating at 0.0 voltage.

Figure 7:
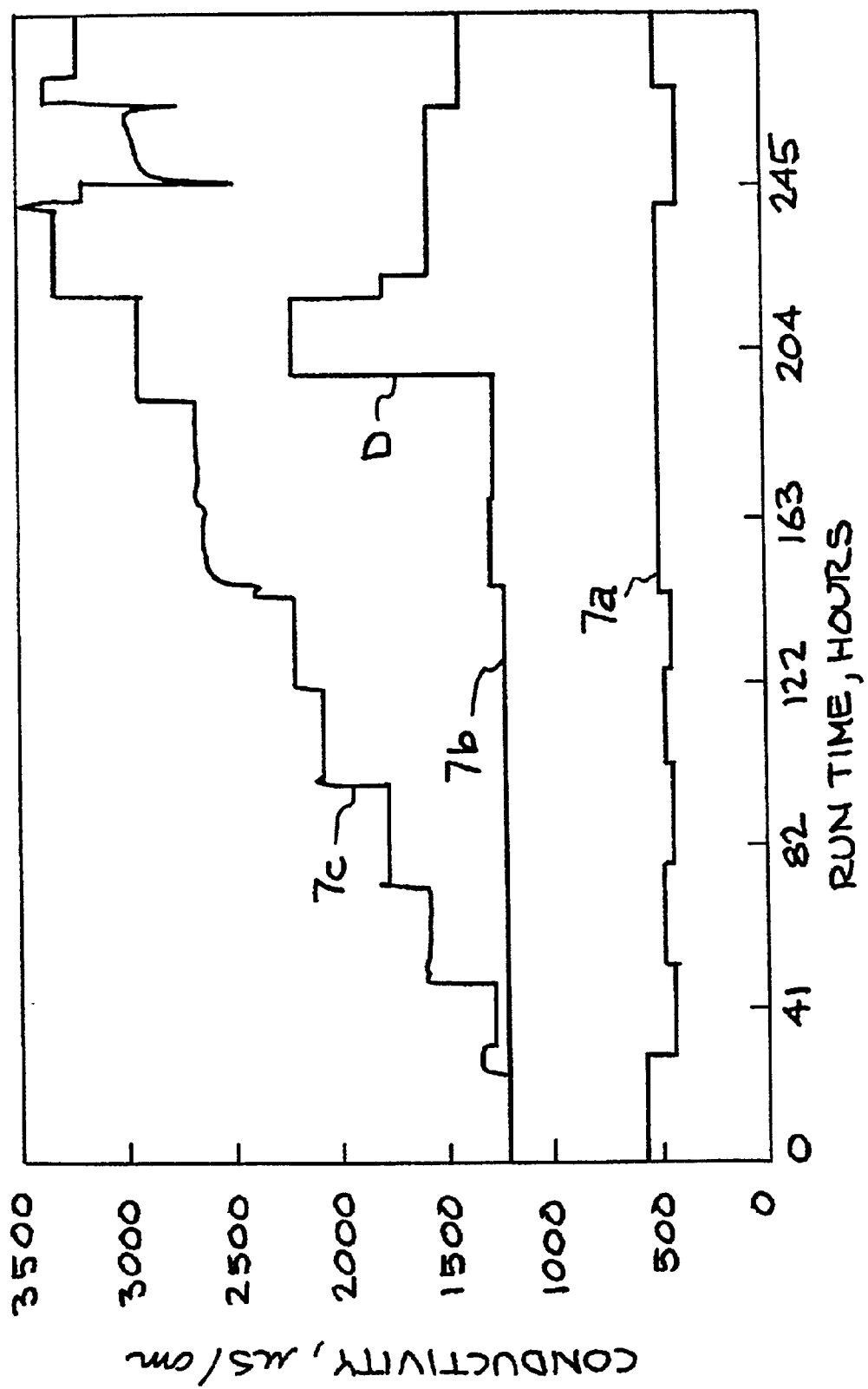
FIG. 7. Performance curve of system operating deionization steps in alternating polarity for 11 cycles at 1.6V where products, intermediate products and waste are accumulated.

At the end of this run, a total of 120 liters of product is collected at 496 micromhos/cm while 14 liters of waste is generated at 3800 micromhos/cm. FIG. 7 illustrates the performance timing chart for the three solutions. Chart 7a represents the conductivity of the product streams. Chart 7b represents the conductivity of the feed stream. During the course of the run, some of the regenerated waste is added to the feed solution to be retreated. Portion D of curve 7b represents an increase in the feed mixture conductivity after the addition of the retreating solution. Chart 7c represents the conductivity of the waste stream. These results demonstrate a yield (i.e., conversion) of greater than 85%, and approaching 90% of the original brackish-type water to potable-quality water product. It is a surprising feature of this invention that the battery system maintains stable capacities for multiple consecutive cycles under such conditions (i.e., at 1.6V). The 150-cell batteries are observed to remain stable at the conclusion of the 11 cycle run.

What is claimed is:

1. An electrode comprising:

a structural support member capable of collecting current, a conductive layer formed on at least one surface at said support member, and a sheet of an electrosorptive medium is secured to said conductive layer at contact locations comprising a surface area less than a total surface area of said sheet that is otherwise in contact with said support member.

2. The electrode of claim 1 wherein said support member includes at least one aperture for allowing a third to flow through said electrode.

3. The electrodes at claim 2 wherein said electrosorptive medium is secured to said conductive layer by a conductive bonding material.

4. The electrode of claim 3 wherein said conductive bonding material comprises an epoxy material.

5. The electrode of claim 1 in combination with an insulator spacing screen between said electrode and a second electrode.

6. The electrode of claim 5 wherein said insulator spacing screen is positioned between said eletrosorptive medium and electrosorptive medium secured to said second electrode.

7. The electrode of claim 1 wherein said contact locations comprise a surface area less than about 25 percent of said total surface area of said sheet that is otherwise in contact with said support member.

* * * * *